United States Patent [19]
Steigerwald

[11] Patent Number: 5,113,337
[45] Date of Patent: May 12, 1992

[54] HIGH POWER FACTOR POWER SUPPLY

[75] Inventor: Robert L. Steigerwald, Burnt Hills, N.Y.

[73] Assignee: General Electric Company, Schenectady, N.Y.

[21] Appl. No.: 652,831

[22] Filed: Feb. 8, 1991

[51] Int. Cl.$^5$ .................. H02M 3/335; H02M 1/12
[52] U.S. Cl. ........................... 363/98; 363/17; 363/40; 363/71; 363/132
[58] Field of Search ............ 363/17, 98, 132, 40, 363/71

[56] References Cited

U.S. PATENT DOCUMENTS

| | | | |
|---|---|---|---|
| 4,109,307 | 5/1977 | Knoll | 363/101 |
| 4,359,644 | 6/1979 | Foord | 307/40 |
| 4,642,745 | 2/1987 | Steigerwald et al. | 363/37 |
| 4,679,129 | 7/1987 | Sakakibara | 363/17 |
| 4,691,275 | 10/1987 | Moscovici | 363/143 |
| 4,809,151 | 2/1989 | Ota | 363/21 |
| 4,825,348 | 4/1989 | Steigerwald | 363/17 |
| 4,845,605 | 6/1989 | Steigerwald | 363/21 |
| 4,884,180 | 11/1989 | Hoffmann | 363/21 |

FOREIGN PATENT DOCUMENTS 3435527 4/1986 Fed. Rep. of Germany ........ 363/45

*Primary Examiner*—Steven L. Stephan
*Assistant Examiner*—Ben M. Davidson
*Attorney, Agent, or Firm*—Jill M. Breedlove; James C. Davis, Jr.; Marvin Snyder

[57] ABSTRACT

An off-line switching power supply includes an ac rectifier and a dual-output switching converter having one output coupled between the ac rectifier and the input to the dual-output converter in order to provide a high power factor, the other output of the dual-output switching converter providing a dc voltage as the power supply output. The outputs of the dual-output converter are fully decoupled so as to allow independent control of the ac input current and the power supply output voltage. In a preferred embodiment, a full-wave ac rectifier bridge is coupled in series with the second output of the power converter via an input resonant boosting converter. A full-bridge dc-to-ac converter is coupled between the dc link and ground for providing an ac signal to excite the boosting converter and for providing another ac voltage through a transformer to an output rectifier to generate a regulated dc output voltage. The amplitude of the regulated output voltage is controlled by pulse width modulation, while active frequency control of the boosting converter is provided to control the amplitude of the ac input current. Alternatively, frequency control of the boosting converter is passive, i.e., depends on the gain characteristics of the boosting converter resonant circuit. As a result of the complete decoupling of the input boosting converter and the power supply output voltage, the off-line switching power supply is capable of drawing high quality current waveforms from the ac source while producing a regulated dc output voltage with fast transient response.

18 Claims, 4 Drawing Sheets

HIGH POWER FACTOR POWER SUPPLY

FIELD OF THE INVENTION

The present invention relates generally to power supplies and, more particularly, to a power supply including an ac-to-dc switching converter operating with high input power factor while maintaining fast transient response at its output.

BACKGROUND OF THE INVENTION

Conventional rectifiers have relatively low power factors which limit the power that can be drawn from an ac line to a fraction of the rating of the line. Furthermore, highly distorted ac line currents are drawn by these conventional rectifiers, often causing interference with other electrical equipment in addition to equipment overcurrents and overvoltages. Techniques for improving power factor include passive waveform shaping methods, i.e. using input filters, and active methods, i.e. using boost or buck converter topologies. Such conventional active methods of obtaining high power factor generally employ a completely separate up-front converter to attain the high power factor followed by a dc-to-dc converter to produce the desired regulated dc output voltage. Thus, the power is converted twice, which is costly and inefficient. Moreover, the upfront converter must convert the entire delivered power. In fact, it must convert a peak power equal to twice the average power delivered.

A power conversion system employing a single power stage while operating at high power factor is described in commonly assigned U.S. Pat. No. 4,642,745 issued on Feb. 10, 1987 to R. L. Steigerwald and W. P. Kornrumpf, which patent is incorporated by reference herein. The power conversion system of the Steigerwald and Kornrumpf patent includes: a full-wave ac rectifier; a dc-to-ac converter; a transformer having a primary winding, a closely-coupled secondary output winding and a loosely-coupled secondary boost winding; and a resonant capacitor coupled to the secondary boost winding. The secondary output winding is controlled by pulse width modulation (PWM), and the secondary boost winding is controlled by frequency modulation, thus allowing relatively independent control of the input current and output voltage. However, since the secondary boost winding and the primary boost winding of the Steigerwald and Kornrumpf patent are coupled, albeit loosely, any adjustment in the dc output voltage by the PWM control affects the input current waveform. Therefore, although the power supply of the hereinabove cited Steigerwald and Kornrumpf patent results in relatively high power factor using only one power stage, it may be desirable in some applications to further increase power factor and otherwise improve performance (e.g., by lowering the output ripple current) by completely decoupling the boosting converter and the power supply output voltage.

OBJECTS OF THE INVENTION

Accordingly, an object of the present invention is to provide a new and improved off-line switching power supply including a single power stage with two outputs operating at a high power factor.

Another object of the present invention is to provide an off-line switching power supply, including a dual-output converter, capable of drawing high quality current waveforms from the ac source while producing a regulated dc output voltage with fast transient response.

Still another object of the present invention is to provide an off-line switching power supply which includes a dual-output power converter having one output coupled in series with the input thereof in order to provide a high power factor and having the other output provide a dc voltage as the power supply output.

Yet another object of the present invention is to provide a high power factor "front-end" power supply, e.g. suitable for supplying a dc bus in a distributed power system or to retrofit existing low power factor switching power supplies.

SUMMARY OF THE INVENTION

The foregoing and other objects of the present invention are achieved in an off-line switching power supply including an ac rectifier and a dual-output switching converter having a first output coupled between the ac rectifier and the input to the dual-output converter for providing a high power factor, the other, i.e. second, output providing a dc voltage as the power supply output. The outputs of the dual-output converter are fully decoupled so as to allow independent control of the ac input current and the power supply output voltage.

In a preferred embodiment, a full-wave ac rectifier bridge is coupled in series with the first output of the dual-output power converter via an input boosting converter means. The boosting converter means includes the parallel combination of a boost transformer secondary winding and a resonant capacitance and further includes a boost rectifier. The output terminal of the boosting converter means is coupled to a dc link. A pair of series-connected energy-storage capacitors, having substantially the same capacitance, is connected between the dc link at the output of the boosting converter means and ground. A full-bridge dc-to-ac converter is also coupled between the dc link and ground for providing a first ac signal to excite the boosting converter means. A boost transformer primary winding is coupled in series with a resonant inductance, the series combination being coupled between the center tap joining the two energy-storage capacitors and one leg of the full-bridge converter. The full-bridge converter provides a second ac voltage through a transformer to an output rectifier to generate a regulated dc output voltage. The two outputs of the dual-output converter are independently controlled. For example, in a preferred embodiment, PWM means are provided to control the amplitude of the regulated output voltage (i.e., the second output), while active frequency control of the boosting converter means is provided to control the first output voltage by controlling the amplitude of the ac input current. In another preferred embodiment, such frequency control of the boosting converter means is passive, i.e., depends on the gain characteristics of the boosting converter resonant circuit. As a result of the complete decoupling of the input boosting converter means and the power supply output voltage, the off-line switching power supply of the present invention is capable of drawing high quality current waveforms from the ac source while producing a regulated dc output voltage with fast transient response.

In another aspect of the present invention, a self-contained high power factor "front-end" power supply, e.g. for supplying a dc bus in a distributed power system or to retrofit existing low power factor switching power supplies, is provided by the combination of an ac rectifier and a dc-to-ac converter, the output of the dc-to-ac converter being coupled in series with the ac rectifier. In a preferred embodiment, the dc-to-ac converter comprises either a full-bridge or half-bridge converter, the output of which is coupled in series with the ac rectifier via a resonant boosting converter means. As a result, high quality current waveforms are drawn from the ac source and a high power factor dc output voltage is provided for supplying the system load, e.g. a plurality of dc-to-dc converters in a distributed power system.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
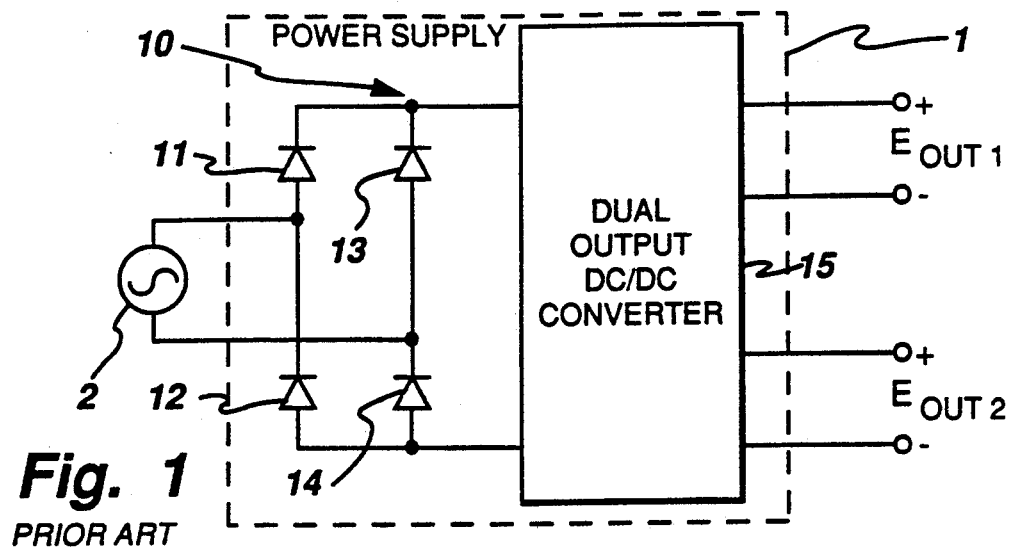
FIG. 1 is a schematic illustration of a typical dual-output power supply.

FIG. 1 illustrates a power supply 1 of a type well-known in the art for receiving an ac power line voltage from an ac power source 2 and providing two independently controllable output voltages $E_{out1}$ and $E_{out2}$. The power supply 1 includes a full-wave rectifier 10, having diodes 11-14 connected together in a full-bridge configuration, for providing a rectified ac line voltage to a typical dual-output dc-to-dc converter 15.

Figure 2:
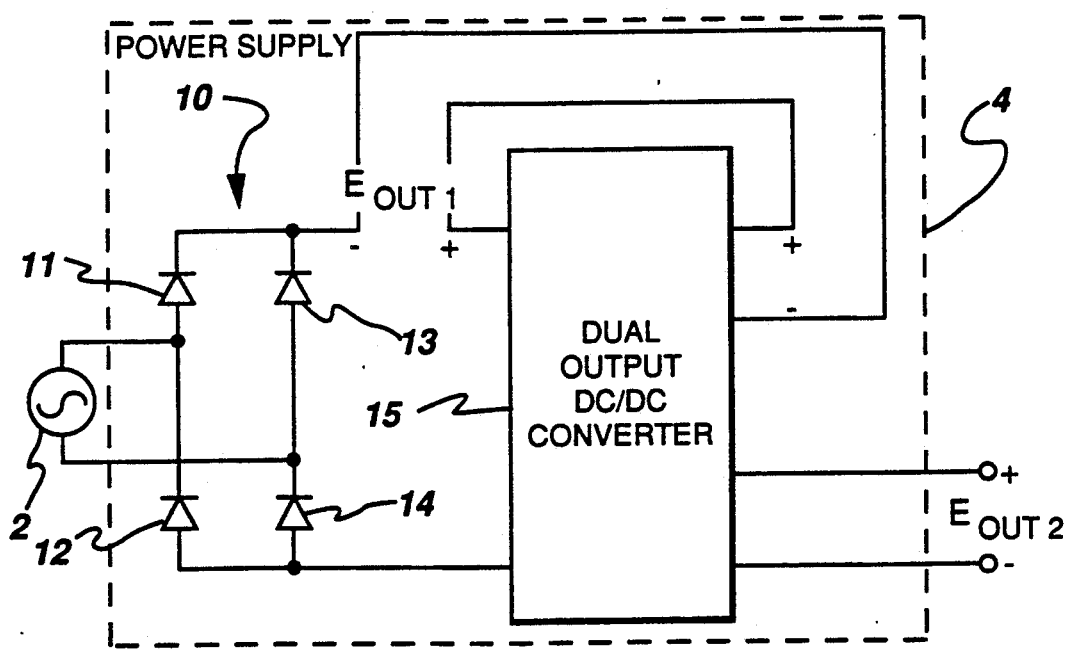
FIG. 2 is a schematic illustration of a power supply including a dual-output dc-to-dc converter in accordance with the present invention.

In accordance with the present invention, as shown in FIG. 2, by coupling one of the outputs, e.g. $E_{out1}$, of dual-output converter 15 in series with the rectified ac line voltage, a high power factor power supply 4 for providing a dc output voltage $E_{out2}$ is realized.

Figure 3B:
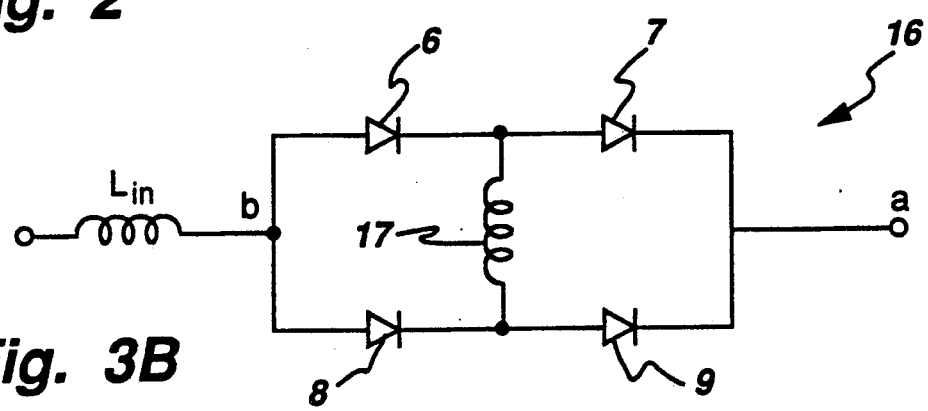
FIG. 3B is a schematic illustration of an alternative embodiment of a boosting converter output circuit useful in the off-line switching power supply of the present invention.
Figure 3A:
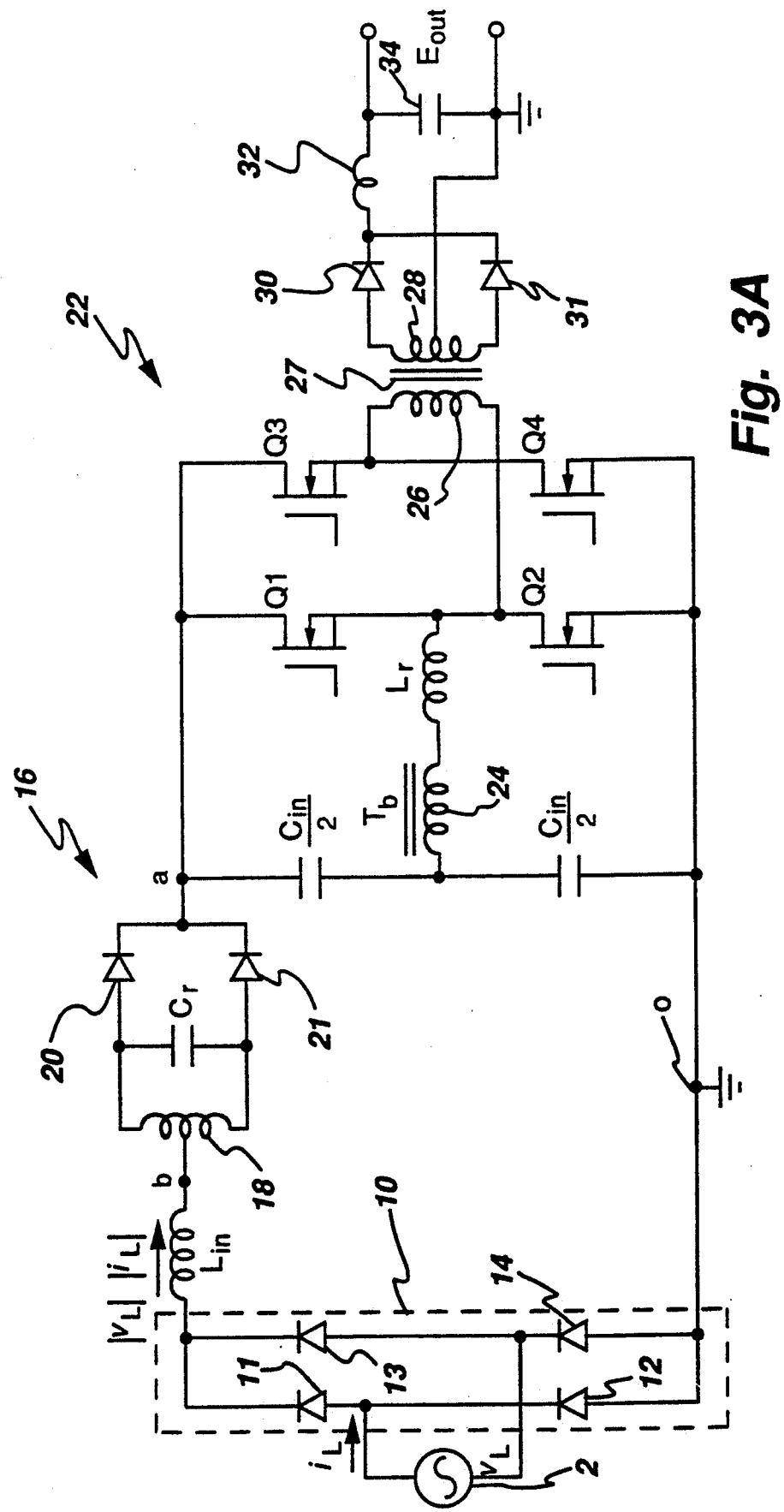
FIG. 3A is a schematic illustration of a preferred embodiment of an off-line switching power supply of the present invention.

FIG. 3A illustrates one preferred embodiment of an off-line switching power supply according to the present invention for converting an ac power line voltage to a regulated dc output voltage. According to the embodiment of FIG. 3A, the power supply of the present invention includes full-wave rectifier 10, having diodes 11-14 connected together in a full-bridge configuration, coupled to ac power 5 source 2. Rectifier 10 provides a full-wave rectified voltage between points b and o. As shown in FIG. 3A, a boosting converter output circuit 16 is coupled in series with the full-bridge rectifier via a high-frequency filter inductor $L_{in}$. Alternatively, high-frequency filter inductor $L_{in}$ may be connected on the ac side of rectifier 11, if desired. The boosting converter output circuit 16 includes a center-tapped boost transformer secondary winding 18 of a boost transformer $T_b$ coupled in parallel with a resonant capacitor $C_r$. The boosting converter output circuit further 5 includes a center-tapped transformer, full-wave boost rectifier comprising diodes 20 and 21, the anodes of which diodes are connected to the respective terminals of the resonant capacitor $C_r$. The cathodes of diodes 20 and 21 are connected together at a point a which is connected to the dc ink at potential $V_{ao}$.

As shown in FIG. 3A, a dc-to-ac converter 22 comprising a full-bridge connection of switching devices $Q_1$-$Q_4$ is connected between the dc link and ground. The series combination of a boost transformer primary winding 24 and a resonant inductor $L_r$ is coupled between the junction joining switching devices $Q_1$ and $Q_2$ of converter 22 and the junction joining a center-tapped pair of relatively large energy-storage capacitors $$\frac{C_{in}}{2}.$$

(Alternatively, capacitors $$\frac{C_{in}}{2}$$

may be relatively small if the series combination thereof is coupled in parallel with another energy-storage capacitor (not shown) which is relatively large.)

An alternative embodiment of boosting converter output circuit 16, as shown in FIG. 3B, includes a full wave bridge rectifier comprising diodes 6-9 and a single secondary winding 17 of boost transformer $T_b$. Furthermore, although boosting power converter output circuit 16 is shown in FIG. 3A as comprising a parallel resonant circuit, it is to be understood that the advantages of the present invention may also be realized using other resonant circuit configurations. For example, a combination series/parallel resonant circuit may be employed wherein another capacitor $C_{r2}$ (not shown) is coupled in series with resonant inductor $L_r$ on either the primary or secondary side of transformer $T_b$. As another example, a series resonant circuit configuration may be employed wherein resonant capacitor $C_r$ is situated in series with resonant inductor $L_r$, on either the primary or secondary side of transformer $T_b$, rather than in parallel therewith as shown in FIG. 3A.

The primary winding 26 of another transformer 27 is coupled across the junctions joining the switching devices $Q_1$-$Q_2$ and $Q_3$-$Q_4$ of the respective full-bridge converter legs. The respective terminals of the secondary winding 28 of transformer 27 are connected to the anodes of diodes 30 and 31. The cathodes of diodes 30 and 31 are connected to an output filter inductor 32 and an output filter capacitor 34. The regulated dc output voltage $E_{out}$ is provided across capacitor 34.

In operation, the boosting converter provides the instantaneous voltage difference between the output voltage $|v_L|$ of the full-bridge rectifier 10 and the dc link voltage $V_{ao}$. The output voltage of the resonant boosting converter is controlled by the switching frequency of full-bridge converter switching devices $Q_1$-$Q_4$ via a first ac signal generated across the boosting converter resonant circuit $L_r$ and $C_r$, while the dc output voltage $E_{out}$ is controlled by pulse width modulation (PWM) of a second ac signal generated across transformer 27, i.e. by phase-shifting the two legs of the converter bridge with respect to each other. Because phase-shifting the two full-bridge converter legs does not affect the voltage applied to the resonant circuit $L_r$ and $C_r$, the boosting converter voltage $V_{ab}$ is independent of the power supply output voltage $E_{out}$. As a result, a fast transient response is attained for the input boosting converter and the power supply output voltage simultaneously.

Figure 4:
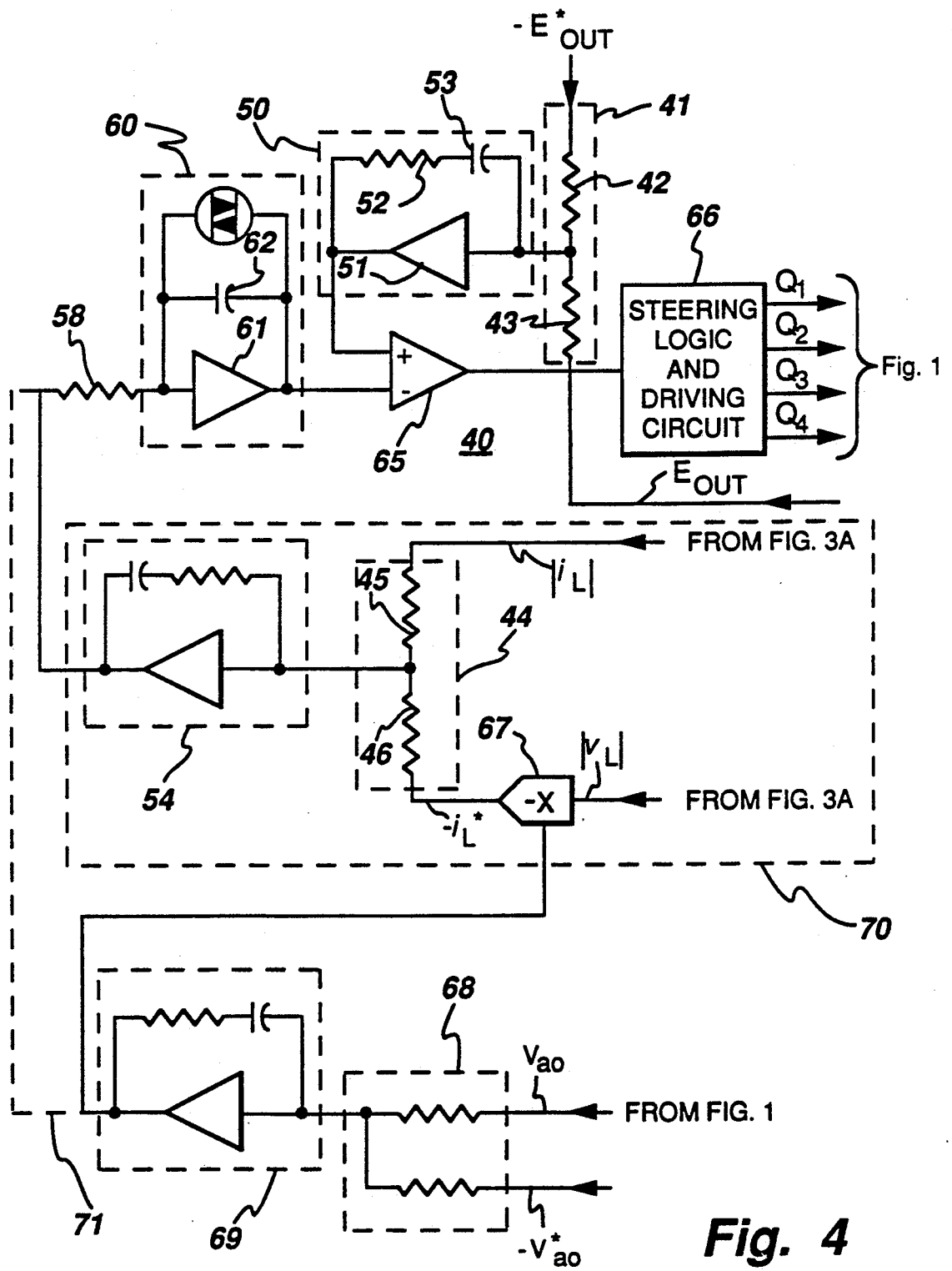
FIG. 4 is a schematic illustration of a suitable control system for controlling operation of the power supply of the present invention.

A suitable control for the power supply of the present invention is illustrated in FIG. 4 and described in Steigerwald and Kornrumpf U.S. Pat. No. 4,642,745, cited hereinabove. (The reference numbers in FIG. 4 correspond to those in the Steigerwald and Kornrumpf patent.) The Steigerwald and Kornrumpf patent describes a PWM control for controlling the regulated dc output voltage by adjusting the duty cycle of the inverter output signal whenever an error is detected between the commanded dc output voltage $E_{out}^*$ and the actual dc output voltage $E_{out}$. In addition, the Steigerwald and Kornrumpf patent describes an active frequency control wherein the actual converter input current is compared with a commanded current in phase with the utility line voltage; any difference causes a frequency adjustment for controlling a boosting converter. Advantageously, since the boosting converter and the power supply output voltage of the present invention are completely decoupled, any adjustment of the dc output voltage using the Steigerwald and Kornrumpf control system will have no effect on the input current to the converter of the present invention.

As another advantage, it has been found that even with no active control of the ac line current, the power supply of the present invention operates with a relatively high power factor and low peak ac line current, due to the favorable gain characteristics of the parallel resonant circuit $L_r$ and $C_r$. Near the valleys of the input ac current waveform, low power is delivered, and the resonant circuit is lightly loaded so that the boosting converter output voltage can ring up to provide the high boost needed, i.e., the difference between the low value of the instantaneous ac line voltage $|v_L|$ and the dc link voltage $V_{ao}$. Conversely, near the peaks of the input ac current waveform, higher power is delivered and the resonant circuit is highly damped. As a result, little boosting action is needed. Hence, the gain characteristics of the parallel resonant boosting converter naturally cause the power supply to yield a high power factor. Advantageously, therefore, the power supply of the present invention does not require active control of the input ac current waveform in order to provide a high power factor. The portion of the control 40 in FIG. 4 represented by dashed lines 70 can thus advantageously be eliminated, with the output of compensator gain block 69 being coupled to the input of ramp generator 58 (as shown by the dashed line 71) via resistor 58, if desired, thereby simplifying the controls required for the high power factor power supply of the present invention.

As still another advantage, the boosting power converter is not required to convert the entire power delivered to the load. That is, for a dc link voltage $V_{ao}$ which is not substantially greater than the peak of the ac input voltage, i.e. less than twice the peak of the ac input voltage, the peak rating of the boosting power converter is less than the peak power delivered to the dc link, as a result of the series connection of the boosting converter in the switching power supply. For example, for a dc link voltage $V_{ao}$ of approximately 25% above the peak of the ac line voltage, the peak power converted by the boosting converter is approximately 78% of the full power delivered, and the average power processed by the boosting converter is approximately 59% of the full power delivered.

Figure 5:
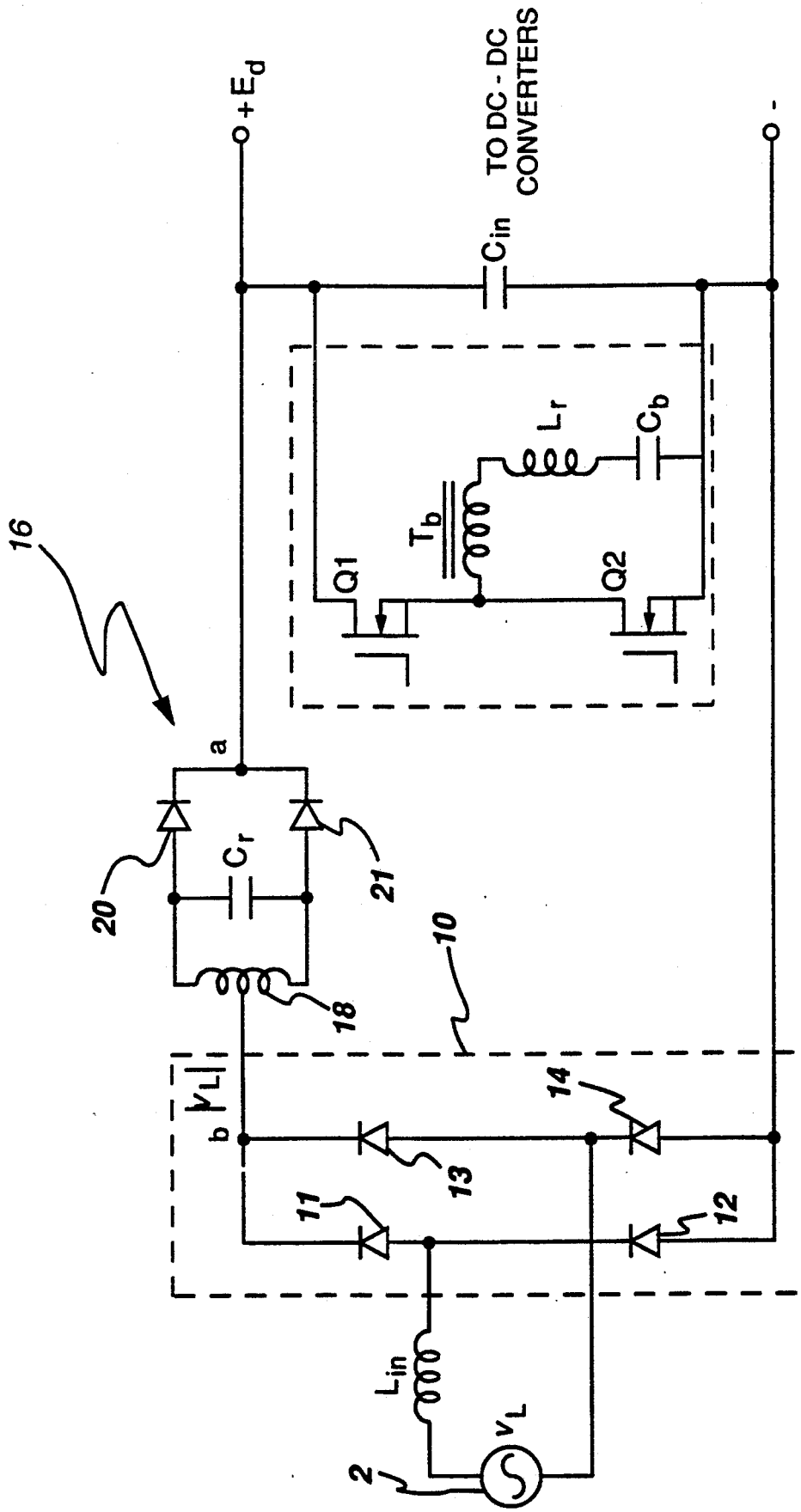
FIG. 5 is a schematic illustration of an alternative embodiment of an off-line switching power supply according to the present invention.

FIG. 5 illustrates another aspect of the power supply of the present invention that is especially suitable for applications wherein a self-contained ac-to-dc "front-end" converter is desirable, e.g. to supply a dc bus in a distributed power system or to retrofit existing low power factor switching power supplies. As shown in FIG. 5, the center-tapped energy-storage capacitors $$\frac{C_{in}}{2}$$

of FIG. 3A have been replaced by a single equivalent energy-storage capacitor $C_{in}$, and a dedicated resonant half-bridge converter 80 has been coupled thereacross. (Alternatively, a full-bridge converter such as that of FIG. 3A comprising switching devices $Q_1$–$Q_4$ may be used.) Converter 80 includes the series combination of switching devices $Q_1$ and $Q_2$ with the resonant circuit comprising the series combination of boost primary winding 24, resonant inductance $L_r$, and capacitance $C_b$ (or, alternatively, a pair of capacitors $$\frac{C_b}{2}$$

coupled in parallel as shown in FIG. 3A for capacitors $$\frac{C_{in}}{2}$$ )

at the junction between switching devices $Q_1$ and $Q_2$. The resonant boosting converter of FIG. 5 may be controlled by the switching frequency of half-bridge converter switching devices $Q_1$ and $Q_2$, a suitable frequency control being described in the Steigerwald and Kornrumpf patent, U.S. Pat. No. 4,642,745, cited hereinabove. As an alternative, the resonant boosting converter could be controlled by suitable PWM control.

While the power converter of the present invention has been described with reference to power supplies including dual-output converters, the outputs of which are either resonant frequency controlled, PWM controlled, or a combination thereof, it is to be understood that any type of dual-output power converter can be used in a power supply in accordance with the present invention to achieve the advantages thereof. Hence, while the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A high power factor power supply for providing a dc output voltage, comprising:
   ac rectifying means for providing a rectified ac voltage when coupled to an ac power line;
   a dual-output power converter having an input, said dual-output power converter providing first and second output voltages, said output voltages being decoupled from each other so as to be independently controllable, said first output voltage being coupled in series between said ac rectifying means and the input of said dual-output power converter, said second output voltage comprising the power supply dc output voltage, said first output voltage being dynamically variable so as to draw substantially sinusoidal current from said ac power line.

2. A high power factor power supply, comprising:
ac rectifying means for providing a rectified ac voltage when coupled to an ac power line;
a dual-output power converter including boosting converter means and dc-to-ac converter means, said boosting converter means including a secondary winding of a boost transformer coupled in series between said ac rectifying means and a dc link voltage, said boosting converter means further comprising resonant circuit means including a combination of said boost transformer, a resonant inductance and a resonant capacitance, said dc-to-ac converter means receiving said dc link voltage and generating first and second ac signals, said first ac signal exciting said boosting converter means, the amplitude of the input current to said boosting converter means being dependent on the frequency of said first ac signal;
output rectifier means for receiving said second ac signal and generating a regulated output dc voltage therefrom, said regulated output dc voltage being decoupled from the output voltage of said resonant circuit means so that said regulated output dc voltage and the output voltage of said resonant circuit means are independently controllable, the output voltage of said resonant circuit means being dynamically variable so as to draw substantially sinusoidal current from said ac power line; and
pulse width modulation means coupled to said output rectifier means for controlling the amplitude of said regulated output dc voltage by pulse width modulating said second ac signal.

3. The power supply of claim 2, further comprising frequency modulation means for controlling the frequency of said first ac signal in a manner to cause said power converter to draw a substantially sinusoidal current from said ac power line in phase with the voltage of said power line.

4. The power supply of claim 3 wherein said secondary winding of said boost transformer includes a center tap, said center tap being coupled to said ac rectifying means; and said power converter further comprises a center-tapped full-wave boost rectifier coupled to said secondary winding of said boost transformer.

5. The power supply of claim 2, further comprising a full-wave boost rectifier comprising a parallel combination of two pairs of series-connected diodes, said secondary winding of said boost transformer being coupled between the junctions joining the diodes of each respective pair.

6. The power supply of claim 2 wherein said resonant capacitance is coupled in parallel with said boost transformer, and said resonant inductance is coupled in series with said boost transformer.

7. The power supply of claim 2 wherein said resonant capacitance is coupled in series with said resonant inductance, the series combination of said resonant capacitance and said resonant inductance being coupled in series with said boost transformer.

8. The power supply of claim 2 wherein:
said resonant capacitance is coupled in parallel with said boost transformer;
said resonant inductance is coupled in series with said boost transformer; and
said resonant circuit means further includes an additional resonant capacitance coupled in series with said resonant inductance.

9. The power supply of claim 2 wherein said dc-to-ac converter means comprises a full-bridge converter.

10. A high power factor power supply, comprising:
ac rectifying means for providing a rectified ac voltage when coupled to an ac power line;
boosting converter means including a secondary winding of a boost transformer coupled in series between said ac rectifying means and a dc link voltage, said boosting converter means further comprising resonant circuit means including a combination of said boost transformer, a resonant inductance and a resonant capacitance;
dc-to-ac converter means for receiving said dc link voltage and generating first and second ac signals, said first ac signal exciting said boosting converter means, the amplitude of the input current to said boosting converter means being dependent on the frequency of said ac signal; and
output rectifier means for receiving said second ac signal and generating a regulated output dc voltage therefrom, said regulated output dc voltage being decoupled from the output voltage of said resonant circuit means so that said regulated output dc voltage and the output voltage of said resonant circuit means are independently controllable, the output voltage of said resonant circuit means being dynamically variable so as to draw substantially sinusoidal current from said ac power line.

11. The power supply of claim 10, further comprising frequency modulation means for controlling the frequency of said ac signal in a manner to cause said power supply to draw a substantially sinusoidal current from said ac power line in phase with the voltage of said power line.

12. The power supply of claim 10 wherein said secondary winding of said boost transformer includes a center tap, said center tap being coupled to said ac rectifying means; and said boosting converter means further comprises a center-tapped full-wave boost rectifier coupled to said boost transformer secondary winding.

13. The power supply of claim 10, further comprising a full-wave boost rectifier comprising a parallel combination of two pairs of series-connected diodes, said secondary winding of said boost transformer being coupled between the junctions joining the diodes of each respective pair.

14. The power supply of claim 10 wherein said resonant capacitance is coupled in parallel with said boost transformer, and said resonant inductance is coupled in series with said boost transformer.

15. The power supply of claim 10 wherein said resonant capacitance is coupled in series with said resonant inductance, the series combination of said resonant capacitance and said resonant inductance being coupled in series with said boost transformer.

16. The power supply of claim 10 wherein:
said resonant capacitance is coupled in parallel with said boost transformer;

said resonant inductance is coupled in series with said boost transformer; and said resonant circuit means further includes an additional resonant capacitance coupled in series with said resonant inductance.

17. The power supply of claim 10 wherein said dc-to-ac converter means comprises a full-bridge converter.

18. The power supply of claim 10 wherein said dc-to-ac converter means comprises a half-bridge converter.

* * * * *